US012705608B2

(12) United States Patent
Bohatka et al.

(10) Patent No.: US 12,705,608 B2
(45) Date of Patent: Aug. 11, 2026

(54) SYSTEM, METHOD, AND COMPUTER PROGRAM PRODUCT FOR SECURE CLIENT DEVICE AND CONSUMER AUTHENTICATION

(71) Applicant: Visa International Service Association, San Francisco, CA (US)

(72) Inventors: Christopher James Bohatka, Mentor, OH (US); Nicholas Mark Simone, Eastlake, OH (US); Andrew Thomas Heiss, Mentor, OH (US); Suyash Umesh Somani, Mayfield Heights, OH (US); Siddhartha Chikatamalla, Mentor, OH (US)

(73) Assignee: Visa International Service Association, San Francisco, CA (US)

( * ) Notice: Subject to any disclaimer, the term of this patent is extended or adjusted under 35 U.S.C. 154(b) by 147 days.

(21) Appl. No.: 18/280,486

(22) PCT Filed: Mar. 11, 2022

(86) PCT No.: PCT/US2022/019929
§ 371 (c)(1),
(2) Date: Sep. 6, 2023

(87) PCT Pub. No.: WO2022/192659
PCT Pub. Date: Sep. 15, 2022

(65) Prior Publication Data

US 2024/0144258 A1 May 2, 2024

Related U.S. Application Data

(60) Provisional application No. 63/160,266, filed on Mar. 12, 2021.

(51) Int. Cl.
*G06Q 20/38* (2012.01)
*G06Q 20/40* (2012.01)

(52) U.S. Cl.
CPC ....... *G06Q 20/3829* (2013.01); *G06Q 20/401* (2013.01)

(58) Field of Classification Search
CPC ......................... G06Q 20/3829; G06Q 20/401
See application file for complete search history.

(56) References Cited

U.S. PATENT DOCUMENTS

2002/0023217 A1 2/2002 Wheeler et al.
2002/0123967 A1 9/2002 Wang
(Continued)

FOREIGN PATENT DOCUMENTS

CN 104838399 A 8/2015
CN 108292398 A 7/2018
(Continued)

OTHER PUBLICATIONS

Yeh; Key account relationship management: the moderating effects of relationship duration and transaction volume; The Service Industries Journal, Jun. 2018, vol. 38 (7-8), p. 379-401.*
(Continued)

*Primary Examiner* — Ilse I Immanuel
(74) *Attorney, Agent, or Firm* — The Webb Law Firm

(57) ABSTRACT

Described are a system, method, and computer program product for secure client device and consumer authentication. The method includes receiving a primary account number (PAN) of an account of a consumer from a merchant system and determining whether the PAN has been registered with a public key of a public-private key pair of a client device of the consumer. The method also includes, in response to determining that the PAN has been registered, transmitting a login request to a transaction processing system including a device identifier of the client device based on the PAN. The method further includes receiving a login response from the transaction processing system asso-
(Continued)

ciated with successful authentication of the client device and, in response to receiving the login response, processing a transaction by generating a transaction authorization request message including the PAN to the transaction processing system.

14 Claims, 10 Drawing Sheets

(56) References Cited

U.S. PATENT DOCUMENTS

| | | | | |
|---|---|---|---|---|
| 2015/0249540 | A1 | 9/2015 | Khalil et al. | |
| 2016/0217448 | A1 | 7/2016 | Laracey | |
| 2016/0226872 | A1 | 8/2016 | Oberheide et al. | |
| 2016/0253663 | A1* | 9/2016 | Clark | G06Q 20/341 705/75 |
| 2018/0255460 | A1* | 9/2018 | Hammad | G06Q 20/42 |
| 2020/0372495 | A1 | 11/2020 | Maheshwari et al. | |

FOREIGN PATENT DOCUMENTS

| | | | | |
|---|---|---|---|---|
| EP | 3588420 | A1 | 1/2020 | |
| GB | 2549118 | A * | 10/2017 | G06Q 20/027 |
| WO | 2021026464 | A1 | 2/2021 | |

OTHER PUBLICATIONS

Horton et al., "A Primer on Payment Security Technologies: Encryption and Tokenization", 2011, First Data Corporation, pp. 1-11.

Kim et al., "Security Analysis and Bypass User Authentication Bound to Device of Windows Hello in the Wild", Security and Communications Networks, 2021, pp. 1-13, vol. 2021.

"Transaction Processing Rules", Mastercard, 2021, pp. 1-411.

* cited by examiner

SYSTEM, METHOD, AND COMPUTER PROGRAM PRODUCT FOR SECURE CLIENT DEVICE AND CONSUMER AUTHENTICATION

CROSS REFERENCE TO RELATED APPLICATIONS

This application is the United States national phase of International Application No. PCT/US2022/019929 filed Mar. 11, 2022, and claims priority to U.S. Provisional Patent Application No. 63/160,266, filed Mar. 12, 2021, the disclosures of which are hereby incorporated by reference in their entirety.

BACKGROUND

1. Technical Field

Disclosed embodiments or aspects relate generally to transaction security in an electronic payment processing network and, in non-limiting embodiments or aspects, to a system, method, and computer program product for secure client device authentication and consumer authentication for completion of a transaction.

2. Technical Considerations

Electronic payment processing networks may receive requests for transactions that are fraudulent, such as in circumstances where a transaction is not actually authorized by the holder of a payment device. Merchants may be incentivized to prevent fraudulent transactions to avoid losses in revenue and merchandise. However, it may be computationally inefficient to allocate fraud prevention measures to individual merchants, which may result in authentication data being redundantly stored across independent merchant systems. Furthermore, additional computational inefficiencies may be introduced during client-side interactions, because separation among merchants may require separate registration and authentication processes for transactions with each unique merchant, causing waste in computer processing time, storage, and bandwidth for both consumers and merchants alike. Additionally, different types of transaction authentication, such as client device authentication, consumer identity authentication, and/or the like, may each require a separate application programming interface (API) integration to connect the merchant system to a transaction processing system or payment gateway.

There is a need for a technical solution to prevent fraudulent transactions using client device authentication and consumer authentication while also reducing instances of independent authentication processes. Moreover, there is a need for a technical solution to consolidate various authentication processes to avoid inefficiencies caused by duplicative measures taken by independent merchants.

SUMMARY

According to some non-limiting embodiments or aspects, provided are improved systems, methods, and computer program products for secure client device and consumer authentication.

According to some non-limiting embodiments or aspects, provided is a computer-implemented method for secure client device and consumer authentication. The method includes receiving, with at least one processor of a payment gateway configured in an electronic payment processing network, a primary account number (PAN) of an account of a consumer from a merchant system. The method also includes determining, with at least one processor of the payment gateway, whether the PAN has been registered with a public key of a public-private key pair of a client device of the consumer for use in a client device authentication process. The method further includes, in response to determining that the PAN has been registered with the public key of the public-private key pair of the client device of the consumer, transmitting, with at least one processor of the payment gateway, a login request to a transaction processing system including a device identifier of the client device based on the PAN, wherein the transaction processing system is configured in the electronic payment processing network as separate from the payment gateway. The method further includes receiving, with at least one processor of the payment gateway, a login response from the transaction processing system associated with successful authentication of the client device based on the public key of the public-private key pair of the client device. The method further includes, in response to receiving the login response associated with the successful authentication of the client device, processing, with at least one processor of the payment gateway, a transaction by generating a transaction authorization request message including the PAN to the transaction processing system.

In some non-limiting embodiments or aspects, the method may further include, in response to determining that the PAN has not been registered with a public key, prompting, with at least one processor of the payment gateway, the client device to generate a new public-private key pair including a new private key and a new public key. The method may further include, in response to determining that the PAN has not been registered with a public key, receiving, with at least one processor of the payment gateway, the new public key of the new public-private key pair from the client device and transmitting, with at least one processor of the payment gateway, the new public key of the new public-private key pair to the transaction processing system.

In some non-limiting embodiments or aspects, the method may further include transmitting, with at least one processor of the payment gateway, a consumer authentication request message to an issuer system associated with an issuer of the account of the consumer. The consumer authentication request message may include data of the client device authentication process, and the issuer system may be configured in the electronic payment processing network as separate from the payment gateway and the transaction processing system. The method may further include receiving, with at least one processor of the payment gateway, a consumer authentication response message from the issuer system indicating successful authentication of the consumer. The transaction may be processed further in response to receipt of the consumer authentication response message.

In some non-limiting embodiments or aspects, the method may further include causing, with at least one processor of the payment gateway, the transaction processing system to execute the client device authentication process by transmitting the login request to the transaction processing system.

In some non-limiting embodiments or aspects, the login response may include data indicating that the public key of the public-private key pair of the client device was successfully matched with a private key of the public-private key pair stored on the client device, through execution of the client device authentication process.

In some non-limiting embodiments or aspects, the method may further include receiving, with at least one processor of the payment gateway, an initial request from the merchant system for the payment gateway to process the transaction. The initial request may include the PAN.

In some non-limiting embodiments or aspects, the transaction may be an online, card-not-present transaction between the consumer and a merchant associated with the merchant system.

According to some non-limiting embodiments or aspects, provided is a system for secure client device and consumer authentication. The system includes at least one processor of a payment gateway configured in an electronic payment processing network. The system also includes at least one non-transitory computer-readable medium including one or more instructions that, when executed by the at least one processor, cause the at least one processor to receive a PAN of an account of a consumer from a merchant system. The one or more instructions also cause the at least one processor to determine whether the PAN has been registered with a public key of a public-private key pair of a client device of the consumer for use in a client device authentication process. The one or more instructions further cause the at least one processor to, in response to determining that the PAN has been registered with the public key of the public-private key pair of the client device of the consumer, transmit a login request to a transaction processing system including a device identifier of the client device based on the PAN, wherein the transaction processing system is configured in the electronic payment processing network as separate from the payment gateway. The one or more instructions further cause the at least one processor to receive a login response from the transaction processing system associated with successful authentication of the client device based on the public key of the public-private key pair of the client device. The one or more instructions further cause the at least one processor to, in response to receiving the login response associated with the successful authentication of the client device, process a transaction by generating a transaction authorization request message including the PAN to the transaction processing system.

In some non-limiting embodiments or aspects, the one or more instructions may further cause the at least one processor to, in response to determining that the PAN has not been registered with a public key, prompt the client device to generate a new public-private key pair including a new private key and a new public key, receive the new public key of the new public-private key pair from the client device, and transmit the new public key of the new public-private key pair to the transaction processing system.

In some non-limiting embodiments or aspects, the one or more instructions may further cause the at least one processor to transmit a consumer authentication request message to an issuer system associated with an issuer of the account of the consumer. The consumer authentication request message may include data of the client device authentication process, and the issuer system may be configured in the electronic payment processing network as separate from the payment gateway and the transaction processing system. The one or more instructions may further cause the at least one processor to receive a consumer authentication response message from the issuer system indicating successful authentication of the consumer. The transaction may be processed further in response to receipt of the consumer authentication response message.

In some non-limiting embodiments or aspects, the one or more instructions may further cause the at least one processor to cause the transaction processing system to execute the client device authentication process by transmitting the login request to the transaction processing system.

In some non-limiting embodiments or aspects, the login response may include data indicating that the public key of the public-private key pair of the client device was successfully matched with a private key of the public-private key pair stored on the client device, through execution of the client device authentication process.

In some non-limiting embodiments or aspects, the one or more instructions may further cause the at least one processor to receive an initial request from the merchant system for the payment gateway to process the transaction, wherein the initial request includes the PAN.

In some non-limiting embodiments or aspects, the transaction may be an online, card-not-present transaction between the consumer and a merchant associated with the merchant system.

According to some non-limiting embodiments or aspects, provided is a computer program product for secure client device and consumer authentication. The computer program product includes at least one non-transitory computer-readable medium including one or more instructions that, when executed by at least one processor of a payment gateway configured in an electronic payment processing network, cause the at least one processor to receive a PAN of an account of a consumer from a merchant system. The one or more instructions also cause the at least one processor to determine whether the PAN has been registered with a public key of a public-private key pair of a client device of the consumer for use in a client device authentication process. The one or more instructions further cause the at least one processor to, in response to determining that the PAN has been registered with the public key of the public-private key pair of the client device of the consumer, transmit a login request to a transaction processing system including a device identifier of the client device based on the PAN, wherein the transaction processing system is configured in the electronic payment processing network as separate from the payment gateway. The one or more instructions further cause the at least one processor to receive a login response from the transaction processing system associated with successful authentication of the client device based on the public key of the public-private key pair of the client device. The one or more instructions further cause the at least one processor to, in response to receiving the login response associated with the successful authentication of the client device, process a transaction by generating a transaction authorization request message including the PAN to the transaction processing system.

In some non-limiting embodiments or aspects, the one or more instructions may further cause the at least one processor to, in response to determining that the PAN has not been registered with a public key, prompt the client device to generate a new public-private key pair including a new private key and a new public key, receive the new public key of the new public-private key pair from the client device, and transmit the new public key of the new public-private key pair to the transaction processing system.

In some non-limiting embodiments or aspects, the one or more instructions may further cause the at least one processor to transmit a consumer authentication request message to an issuer system associated with an issuer of the account of the consumer.

The consumer authentication request message may include data of the client device authentication process, and the issuer system may be configured in the electronic payment processing network as separate from the payment gateway and the transaction processing system. The one or more instructions may further cause the at least one processor to receive a consumer authentication response message from the issuer system indicating successful authentication of the consumer. The transaction may be processed further in response to receipt of the consumer authentication response message.

In some non-limiting embodiments or aspects, the one or more instructions may further cause the at least one processor to cause the transaction processing system to execute the client device authentication process by transmitting the login request to the transaction processing system.

In some non-limiting embodiments or aspects, the login response may include data indicating that the public key of the public-private key pair of the client device was successfully matched with a private key of the public-private key pair stored on the client device, through execution of the client device authentication process.

In some non-limiting embodiments or aspects, the one or more instructions further cause the at least one processor to receive an initial request from the merchant system for the payment gateway to process the transaction. The initial request may include the PAN.

Other non-limiting embodiments or aspects of the present disclosure will be set forth in the following numbered clauses:

Clause 1: A computer-implemented method comprising: receiving, with at least one processor of a payment gateway configured in an electronic payment processing network, a primary account number (PAN) of an account of a consumer from a merchant system; determining, with at least one processor of the payment gateway, whether the PAN has been registered with a public key of a public-private key pair of a client device of the consumer for use in a client device authentication process; in response to determining that the PAN has been registered with the public key of the public-private key pair of the client device of the consumer, transmitting, with at least one processor of the payment gateway, a login request to a transaction processing system comprising a device identifier of the client device based on the PAN, wherein the transaction processing system is configured in the electronic payment processing network as separate from the payment gateway; receiving, with at least one processor of the payment gateway, a login response from the transaction processing system associated with successful authentication of the client device based on the public key of the public-private key pair of the client device; and, in response to receiving the login response associated with the successful authentication of the client device, processing, with at least one processor of the payment gateway, a transaction by generating a transaction authorization request message comprising the PAN to the transaction processing system.

Clause 2: The computer-implemented method of clause 1, further comprising, in response to determining that the PAN has not been registered with a public key: prompting, with at least one processor of the payment gateway, the client device to generate a new public-private key pair comprising a new private key and a new public key; receiving, with at least one processor of the payment gateway, the new public key of the new public-private key pair from the client device; and transmitting, with at least one processor of the payment gateway, the new public key of the new public-private key pair to the transaction processing system.

Clause 3: The computer-implemented method of clause 1 or clause 2, further comprising: transmitting, with at least one processor of the payment gateway, a consumer authentication request message to an issuer system associated with an issuer of the account of the consumer, wherein the consumer authentication request message comprises data of the client device authentication process, and wherein the issuer system is configured in the electronic payment processing network as separate from the payment gateway and the transaction processing system; and receiving, with at least one processor of the payment gateway, a consumer authentication response message from the issuer system indicating successful authentication of the consumer, wherein the transaction is processed further in response to receipt of the consumer authentication response message.

Clause 4: The computer-implemented method of any of clauses 1-3, further comprising causing, with at least one processor of the payment gateway, the transaction processing system to execute the client device authentication process by transmitting the login request to the transaction processing system.

Clause 5: The computer-implemented method of any of clauses 1-4, wherein the login response comprises data indicating that the public key of the public-private key pair of the client device was successfully matched with a private key of the public-private key pair stored on the client device, through execution of the client device authentication process.

Clause 6: The computer-implemented method of any of clauses 1-5, further comprising receiving, with at least one processor of the payment gateway, an initial request from the merchant system for the payment gateway to process the transaction, wherein the initial request comprises the PAN.

Clause 7: The computer-implemented method of any of clauses 1-6, wherein the transaction is an online, card-not-present transaction between the consumer and a merchant associated with the merchant system.

Clause 8: A system, comprising: at least one processor of a payment gateway configured in an electronic payment processing network; and at least one non-transitory computer-readable medium including one or more instructions that, when executed by the at least one processor, cause the at least one processor to: receive a primary account number (PAN) of an account of a consumer from a merchant system; determine whether the PAN has been registered with a public key of a public-private key pair of a client device of the consumer for use in a client device authentication process; in response to determining that the PAN has been registered with the public key of the public-private key pair of the client device of the consumer, transmit a login request to a transaction processing system comprising a device identifier of the client device based on the PAN, wherein the transaction processing system is configured in the electronic payment processing network as separate from the payment gateway; receive a login response from the transaction processing system associated with successful authentication of the client device based on the public key of the public-private key pair of the client device; and, in response to receiving the login response associated with the successful authentication of the client device, process a transaction by generating a transaction authorization request message comprising the PAN to the transaction processing system.

Clause 9: The system of clause 8, wherein the one or more instructions further cause the at least one processor to, in response to determining that the PAN has not been registered with a public key: prompt the client device to generate a new public-private key pair comprising a new private key and a new public key; receive the new public key of the new public-private key pair from the client device; and transmit the new public key of the new public-private key pair to the transaction processing system.

Clause 10: The system of clause 8 or clause 9, wherein the one or more instructions further cause the at least one processor to: transmit a consumer authentication request message to an issuer system associated with an issuer of the account of the consumer, wherein the consumer authentication request message comprises data of the client device authentication process, and wherein the issuer system is configured in the electronic payment processing network as separate from the payment gateway and the transaction processing system; and receive a consumer authentication response message from the issuer system indicating successful authentication of the consumer, wherein the transaction is processed further in response to receipt of the consumer authentication response message.

Clause 11: The system of any of clauses 8-10, wherein the one or more instructions further cause the at least one processor to cause the transaction processing system to execute the client device authentication process by transmitting the login request to the transaction processing system.

Clause 12: The system of any of clauses 8-11, wherein the login response comprises data indicating that the public key of the public-private key pair of the client device was successfully matched with a private key of the public-private key pair stored on the client device, through execution of the client device authentication process.

Clause 13: The system of any of clauses 8-12, wherein the one or more instructions further cause the at least one processor to receive an initial request from the merchant system for the payment gateway to process the transaction, wherein the initial request comprises the PAN.

Clause 14: The system of any of clauses 8-13, wherein the transaction is an online, card-not-present transaction between the consumer and a merchant associated with the merchant system.

Clause 15: A computer program product comprising at least one non-transitory computer-readable medium including one or more instructions that, when executed by at least one processor of a payment gateway configured in an electronic payment processing network, cause the at least one processor to: receive a primary account number (PAN) of an account of a consumer from a merchant system; determine whether the PAN has been registered with a public key of a public-private key pair of a client device of the consumer for use in a client device authentication process; in response to determining that the PAN has been registered with the public key of the public-private key pair of the client device of the consumer, transmit a login request to a transaction processing system comprising a device identifier of the client device based on the PAN, wherein the transaction processing system is configured in the electronic payment processing network as separate from the payment gateway; receive a login response from the transaction processing system associated with successful authentication of the client device based on the public key of the public-private key pair of the client device; and, in response to receiving the login response associated with the successful authentication of the client device, process a transaction by generating a transaction authorization request message comprising the PAN to the transaction processing system.

Clause 16: The computer program product of clause 15, wherein the one or more instructions further cause the at least one processor to, in response to determining that the PAN has not been registered with a public key: prompt the client device to generate a new public-private key pair comprising a new private key and a new public key; receive the new public key of the new public-private key pair from the client device; and transmit the new public key of the new public-private key pair to the transaction processing system.

Clause 17: The computer program product of clause 15 or clause 16, wherein the one or more instructions further cause the at least one processor to: transmit a consumer authentication request message to an issuer system associated with an issuer of the account of the consumer, wherein the consumer authentication request message comprises data of the client device authentication process, and wherein the issuer system is configured in the electronic payment processing network as separate from the payment gateway and the transaction processing system; and receive a consumer authentication response message from the issuer system indicating successful authentication of the consumer, wherein the transaction is processed further in response to receipt of the consumer authentication response message.

Clause 18: The computer program product of any of clauses 15-17, wherein the one or more instructions further cause the at least one processor to cause the transaction processing system to execute the client device authentication process by transmitting the login request to the transaction processing system.

Clause 19: The computer program product of any of clauses 15-18, wherein the login response comprises data indicating that the public key of the public-private key pair of the client device was successfully matched with a private key of the public-private key pair stored on the client device, through execution of the client device authentication process.

Clause 20: The system of any of clauses 15-19, wherein the one or more instructions further cause the at least one processor to receive an initial request from the merchant system for the payment gateway to process the transaction, wherein the initial request comprises the PAN.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments or aspects that are illustrated in the accompanying schematic figures, in which.

Figure 1:
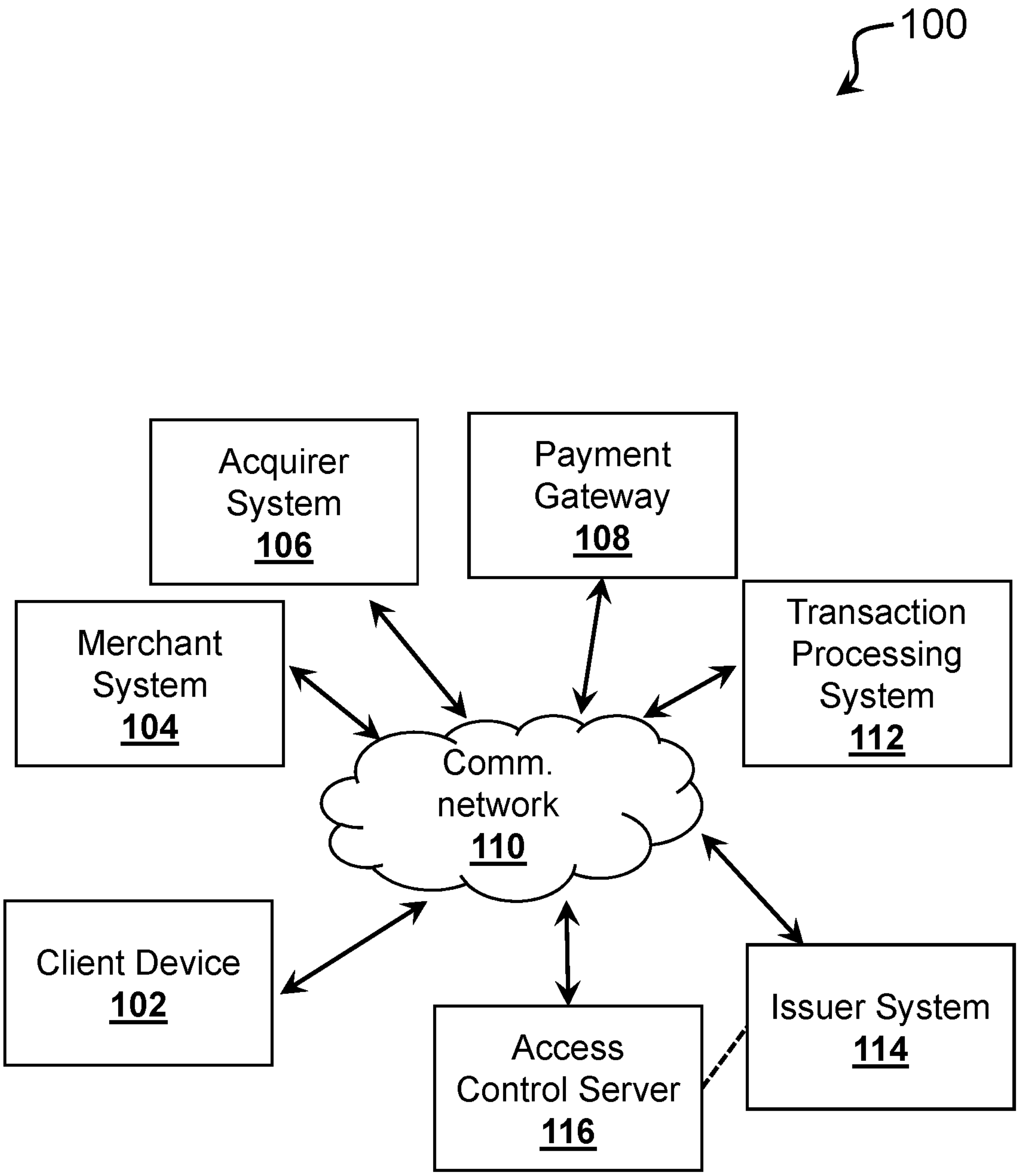
FIG. 1 is a diagram of non-limiting embodiments or aspects of an environment in which systems, apparatuses, and/or methods, as described herein, may be implemented.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. An "application" or "application program interface" (API) may refer to computer code or other data sorted on a computer-readable medium that may be executed by a processor to facilitate the interaction between software components, such as a client-side front-end and/or server-side back-end for receiving data from the client. An "interface" may refer to a generated display, such as one or more graphical user interfaces (GUIs) with which a user may interact, either directly or indirectly (e.g., through a keyboard, mouse, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects of the present disclosure are directed to a system, method, and computer program product for secure client device and consumer authentication. It will be appreciated that described systems and methods optimize computer resource use (e.g., storage requirements, processing capacity, bandwidth, etc.) by consolidating authentication processes in a payment gateway system. For example, registering a PAN with a public key of a client device for use in a client device authentication process (e.g., Fast Identity Online (FIDO) authentication), rather than with a user identifier for each merchant, allows for singular registration of a client device for use with a PAN for all networked merchants. Accordingly, the number of computer operations required for full use of a client device with a PAN is reduced. Moreover, by consolidating processes for authentication of a client device and/or consumer in a payment gateway system, duplicative stored data is reduced and transaction processing may be streamlined when a new transaction is requested. Furthermore, additional computer resource savings may be realized by integrating client device authentication processes with consumer authentication processes (e.g., 3-D Secure protocol), so that surplus APIs, interfaces, channels, and instances of communication may be reduced at the time of transacting.

Referring now to FIG. 1, illustrated is a diagram of an example environment 100 in which devices, systems, and/or methods, described herein, may be implemented. As shown in FIG. 1, environment 100 may include a client device 102, a merchant system 104, an acquirer system 106, a payment gateway 108, a transaction processing system 112, an issuer system 114, an access control server (ACS) 116, and a communication network 110. The issuer system 114 may include the ACS 116. In some non-limiting embodiments or aspects, the ACS 116 may be operated on behalf of an issuer (e.g., by a third party) and associated with an issuer system 114. The payment gateway 108 and/or the transaction processing system 112 may include an authentication server for registering PANs in association with public keys of client devices 102, for facilitation of a client device authentication process. Further subsystems of the merchant system 104, payment gateway 108, and transaction processing system 112 are described in connection with FIGS. 8-10, below.

The client device 102 may include one or more processors configured to communicate with a merchant system 104, an acquirer system 106, a payment gateway 108, a transaction processing system 112, an issuer system 114, and/or an ACS 116, at least partly over a communication network 110. In some non-limiting embodiments or aspects, the client device 102 may be a mobile device that acts as a payment device of the consumer. The client device 102 may be configured with a user interface (e.g., an application, a merchant website, etc.) for receiving user input, such as transaction information and user credentials for completing a transaction process and a login process, respectively. The client device 102 may also generate a public-private key pair associated with the client device 102, and may store the private key (e.g., in an encrypted format) on the client device 102. The client device 102 may receive a prompt from a payment gateway 108 and/or a transaction processing system 112 to generate the public-private key pair as part of a registration process with the system. The client device 102 may transmit the generated public key to the payment gateway 108 and/or transaction processing system 112 to store the public key in association with a device identifier of the client device 102 and/or a consumer identifier associated with the consumer, such as a PAN. By registering the PAN once with the payment gateway 108 and/or transaction processing system 112, the client device authentication process may be executed through a single registration that works for multiple merchants, thereby avoiding computational waste due to redundant registrations.

The payment gateway 108 may include one or more processors configured to communicate with a client device 102, a merchant system 104, an acquirer system 106, a transaction processing system 112, an issuer system 114, and/or an ACS 116, at least partly over a communication network 110. The transaction processing system 112 may be configured in the electronic payment processing network as separate from the payment gateway 108, and the payment gateway 108 may assist multiple merchant systems 104 with processing transactions by communicating with the transaction processing system 112 on behalf of the merchant systems 104. The payment gateway 108 may further be programmed to execute client device and/or consumer authentication processes, as described herein. For example, the payment gateway 108 may receive a PAN of an account of a consumer from a merchant system 104. The PAN may be received in association with an initial request for completion of a transaction (e.g., an online, card-not-present transaction) between the account of the consumer and an account of a merchant corresponding to the merchant system 104. The payment gateway 108 may determine whether the PAN has been registered with a public key of a public-private key pair of a client device 102 of the consumer for use in a client device authentication process.

In response to determining that the PAN has not be registered with a public key of a public-private key pair of the client device 102 for use in a client device authentication process, the payment gateway 108 may prompt the client device 102 to generate a new public-private key pair including a new private key and a new public key. The payment gateway 108 may then receive the new public key of the new public-private key pair from the client device 102 and transmit the new public key to the transaction processing system 112, for registration of the new public key with the PAN.

In response to determining that the PAN has been registered with the public key of the public-private key pair of the client device 102 of the consumer, the payment gateway 108 may transmit a login request to the transaction processing system 112. The login request may include a device identifier of the client device 102 that is based on the PAN (e.g., is the PAN, includes the PAN, is derived from the PAN, etc.). The transaction processing system 112 may then attempt to execute a login process (e.g., FIDO login) in the client device authentication process using the PAN and the device identifier. The payment gateway 108 may then receive a login response from the transaction processing system 112 associated with successful or failed authentication of the client device 102 based on the public key of the public-private key pair of the client device 102 (e.g., by attempting to match the public key with the private key, such as by successfully or unsuccessfully decrypting a signature encrypted with the private key of the client device). In response to receiving a login response associated with successful authentication of the client device 102, the payment gateway 108 may process the transaction by generating a transaction authorization request message including the PAN to the transaction processing system 112.

Communication network 110 may include one or more wired and/or wireless networks. For example, communication network 110 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
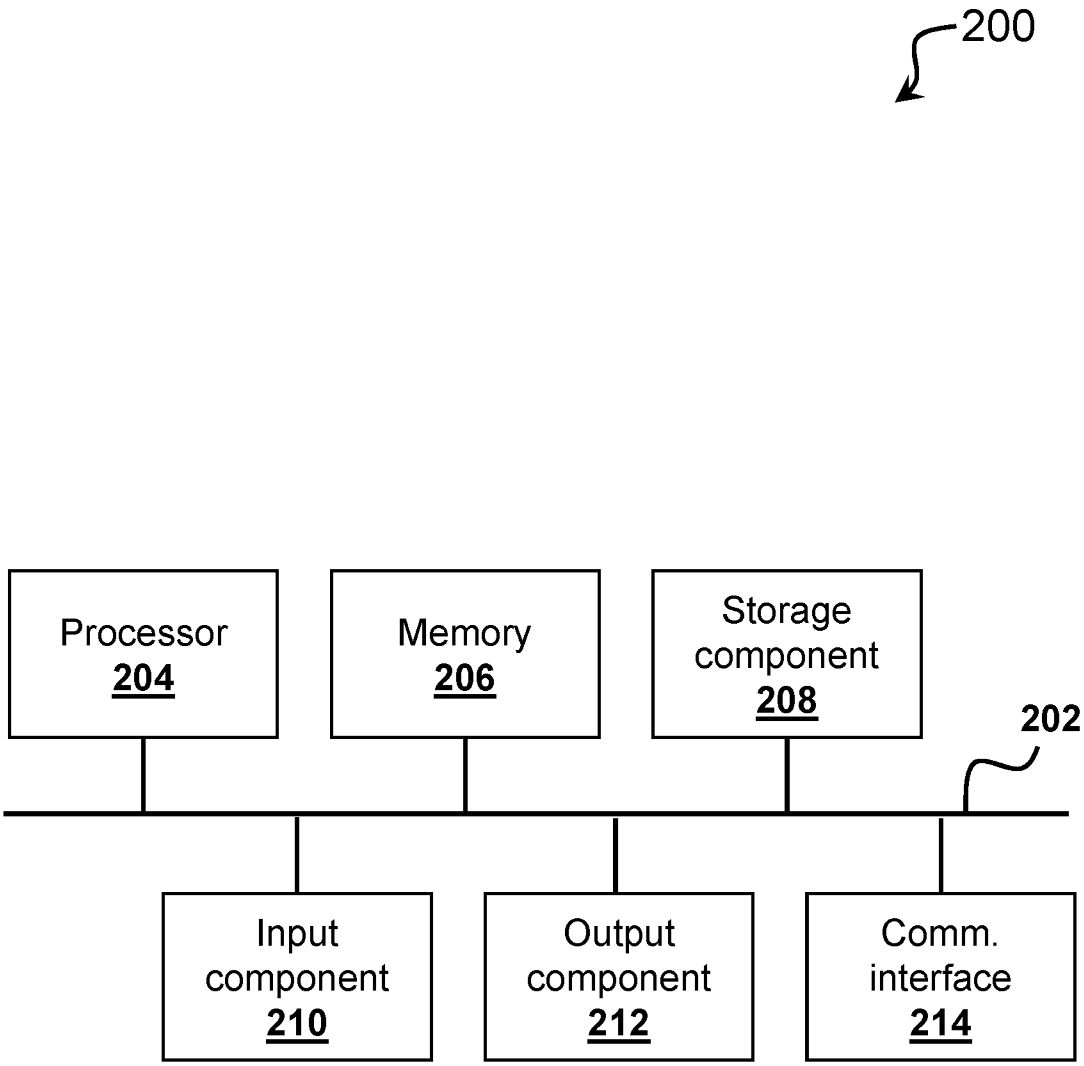
FIG. 2 is a diagram of non-limiting embodiments or aspects of components of one or more devices of FIG. 1.

Referring now to FIG. 2, illustrated is a diagram of example components of device 200. Device 200 may correspond to one or more devices of a client device 102, a merchant system 104, an acquirer system 106, a payment gateway 108, a transaction processing system 112, an issuer system 114, an ACS 116, and/or a communication network 110. Device 200 may further correspond to the subsystems of the foregoing devices and systems, as further described in detail in connection with FIGS. 8-10. In some non-limiting embodiments or aspects, one or more devices of the foregoing may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include encryption data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
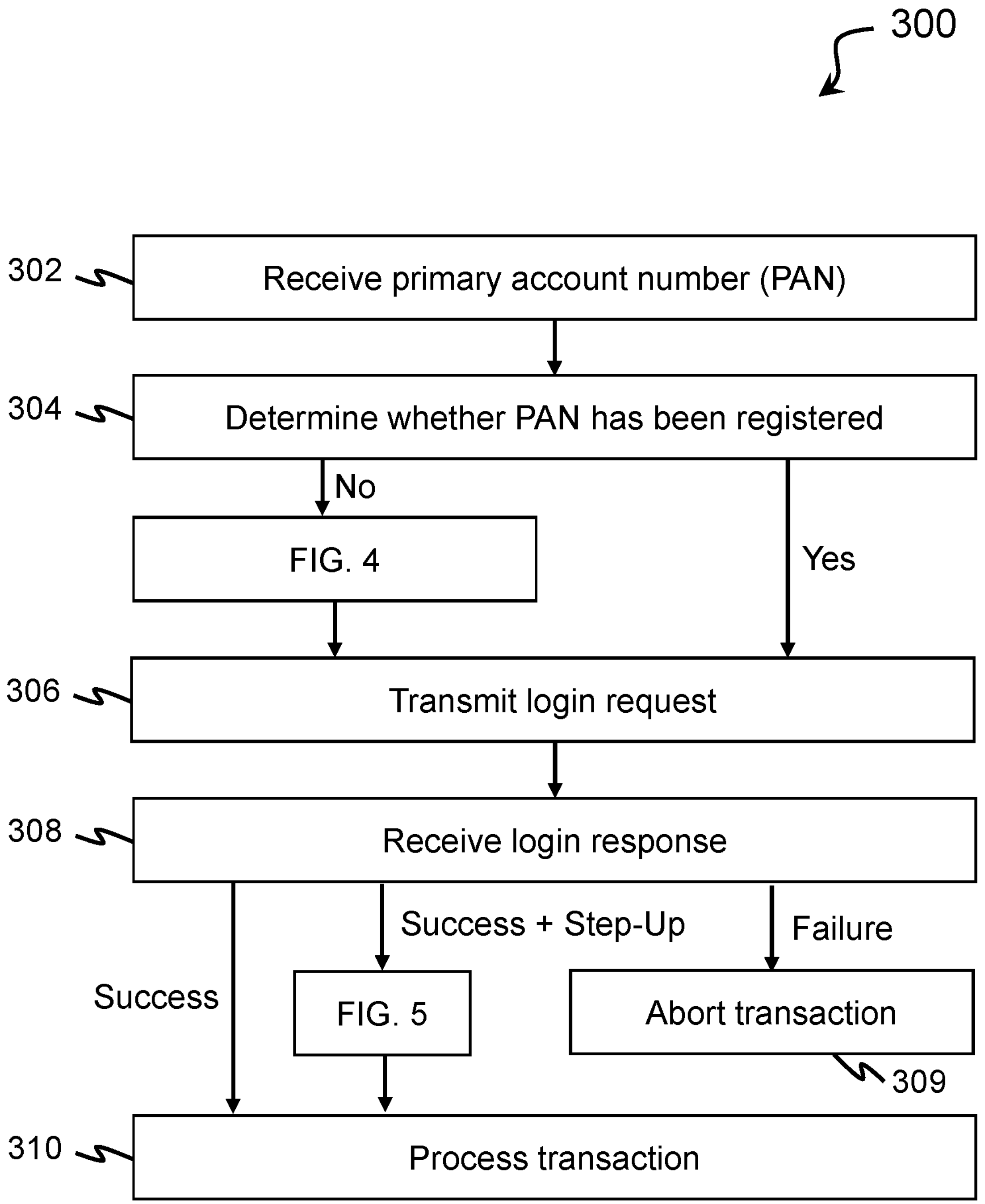
FIG. 3 is a flow diagram of non-limiting embodiments or aspects of a method for secure client device and consumer authentication.

Referring now to FIG. 3, illustrated is a flow diagram of a method 300 for secure client device and consumer authentication. One or more steps of method 300 may be executed by one or more processors of a payment gateway 108, a transaction processing system 112, and/or other computing device. Each step of method 300 may be performed by a same or different processor as any other step of method 300. One or more computing devices for performing method 300 may be associated with a same or separate computing device or system. The order of the steps depicted in FIG. 3 are for illustrative purposes only and may be rearranged or combined, unless otherwise explicitly provided for as described herein.

In step 302, a PAN may be received. For example, the payment gateway 108 may receive a PAN of an account (e.g., a credit account, a debit account, etc.) of a consumer.

The payment gateway 108 may receive the PAN via a merchant interface (e.g., an application, a website, etc.) operating on a client device 102 for completion of a transaction between the consumer and the merchant. The merchant interface may be configured to show a consumer authentication form (e.g., for 3-D Secure authentication), while the client device 102 is also communicating with the payment gateway 108 to complete a client device authentication process (e.g., for FIDO authentication). The PAN may be hashed for security purposes, such as by a private key of the client device 102.

In step 304, it may be determined whether the PAN has been registered. For example, the payment gateway 108 may determine whether the PAN has been registered with (e.g., stored in relationship to) a public key of a public-private key pair of the client device 102 of the consumer, for use in a client device authentication process. The PAN (e.g., the hashed PAN) may be stored by an authentication server of the payment gateway 108 and/or a transaction processing system 112. In response to determining that the PAN has not been registered with a public key for use in a client device authentication process, the method 300 may proceed to the method 400 depicted in FIG. 4. In response to determining that the PAN has been registered with a public key for use in a client device authentication process, the method 300 may proceed to step 306.

In step 306, a login request may be transmitted. For example, the payment gateway 108 may transmit a login request to the transaction processing system 112 including a device identifier (e.g., a username) based on the PAN (e.g., generated from the PAN, including the PAN, being the PAN, and/or the like). The login request may be a communication configured to cause an authentication server (e.g., of the transaction processing system 112) to authenticate the client device 102 based on the PAN and/or a public key registered with the PAN.

In step 308, a login response may be received. For example, the payment gateway 108 may receive a login response from the transaction processing system 112 associated with successful or failed authentication of the client device 102 based on the public key of the public-private key pair of the client device. The login response may be a communication from an authentication server (e.g., of the transaction processing system 112) including assertion data indicating whether or not the client device has been authenticated. In response to receiving a login response from the transaction processing system associated with failed authentication of the client device based on the public key of the public-private key pair of the client device, the method 300 may proceed to abort the transaction in step 309, or otherwise return to step 306 to attempt the login request again. In response to receiving a login response from the transaction processing system associated with successful authentication of the client device based on the public key of the public-private key pair of the client device, the method 300 may determine whether step-up authentication is required (e.g., based on a parameter of the transaction, based on a predetermined preference of the merchant system 104, and/or the like). If the authentication of the client device 102 was successful and no further step-up authentication is required, the method 300 may proceed to step 310. If the authentication of the client device 102 was successful and further step-up authentication is required, the method 300 may proceed to method 500 depicted in FIG. 5.

In step 310, a transaction may be processed. For example, the payment gateway 108 may process a transaction by generating a transaction authorization request message including the PAN (e.g., hashed PAN) to the transaction processing system 112. The transaction to be processed may be a transaction triggered in a merchant interface on the client device 102, which may be used for triggering client device authentication (e.g., FIDO authentication) and/or consumer authentication (e.g., 3-D Secure authentication). The transaction may be processed in response to successful client device authentication and/or consumer authentication.

Figure 4:
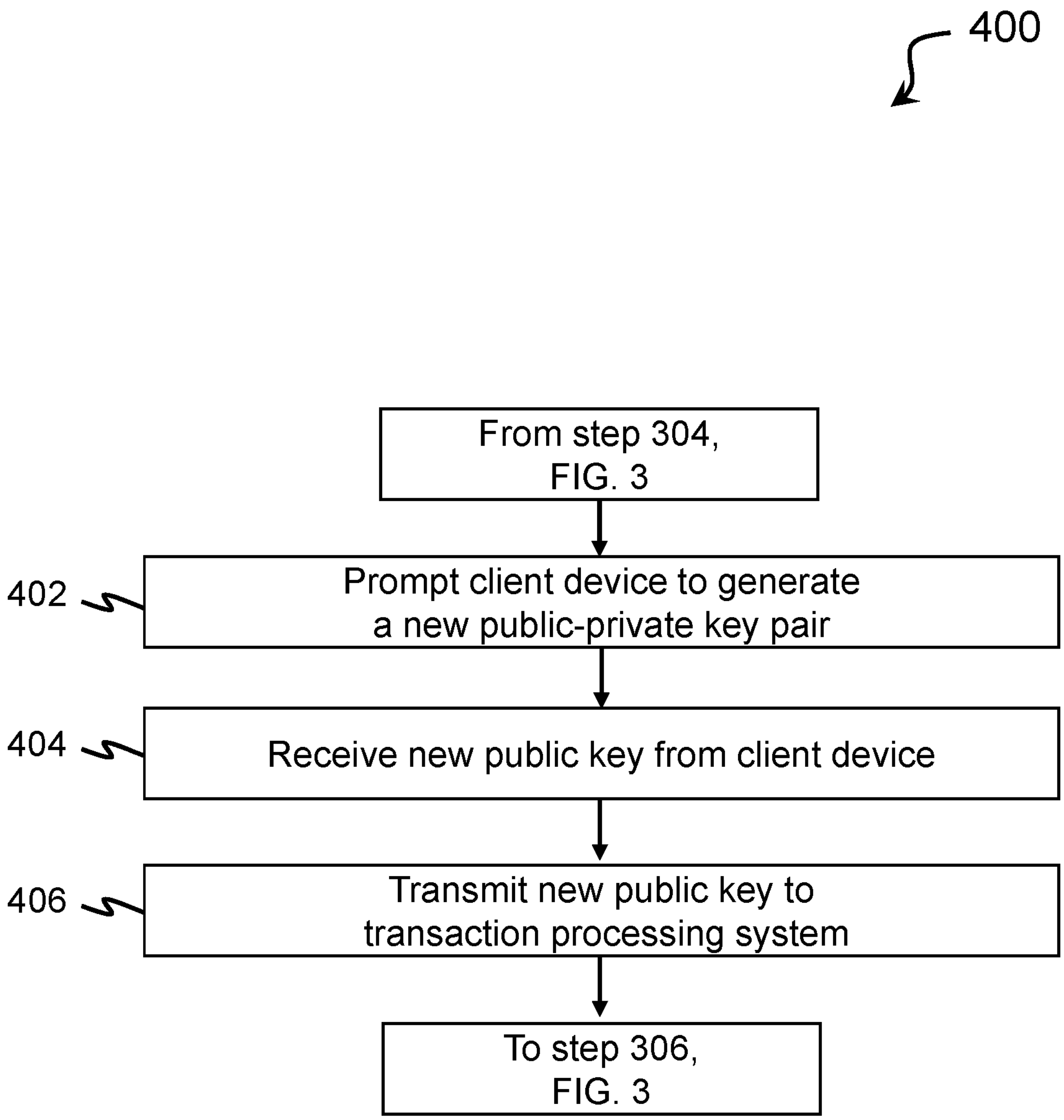
FIG. 4 is a flow diagram of non-limiting embodiments or aspects of a method for secure client device and consumer authentication.

Referring now to FIG. 4, illustrated is a flow diagram of a method 400 for secure client device and consumer authentication. One or more steps of method 400 may be executed by one or more processors of a payment gateway 108, a transaction processing system 112, and/or other computing device. Each step of method 400 may be performed by a same or different processor as any other step of method 400. One or more computing devices for performing method 400 may be associated with a same or separate computing device or system. The order of the steps depicted in FIG. 4 are for illustrative purposes only and may be rearranged or combined, unless otherwise explicitly provided for as described herein.

As described in connection with FIG. 3, in step 304, the payment gateway 108 may determine whether the PAN has been registered. In response to determining that the PAN has not been registered with a public key for use in a client device authentication process, the method 300 may proceed to step 402. In step 402, the client device 102 may be prompted to generate a new public-private key pair. For example, the payment gateway 108 may prompt the client device 102 to generate a new public-private key pair including a new private key and a new public key.

In step 404, the new public key may be received from the client device 102. For example, the payment gateway 108 may receive the new public key of the new public-private key pair from the client device 102, after the client device 102 generates the new public-private key pair in response to the prompt from the payment gateway 108.

In step 406, the new public key may be transmitted to the transaction processing system 112. For example, the payment gateway 108, after receiving the new public key in step 404, may transmit the new public key of the new public-private key pair to the transaction processing system 112 for storage and registration for use in a client device authentication process. After the completion of step 406, method 400 may proceed to step 306 of method 300 (depicted in FIG. 3) to continue the client device authentication process.

Figure 5:
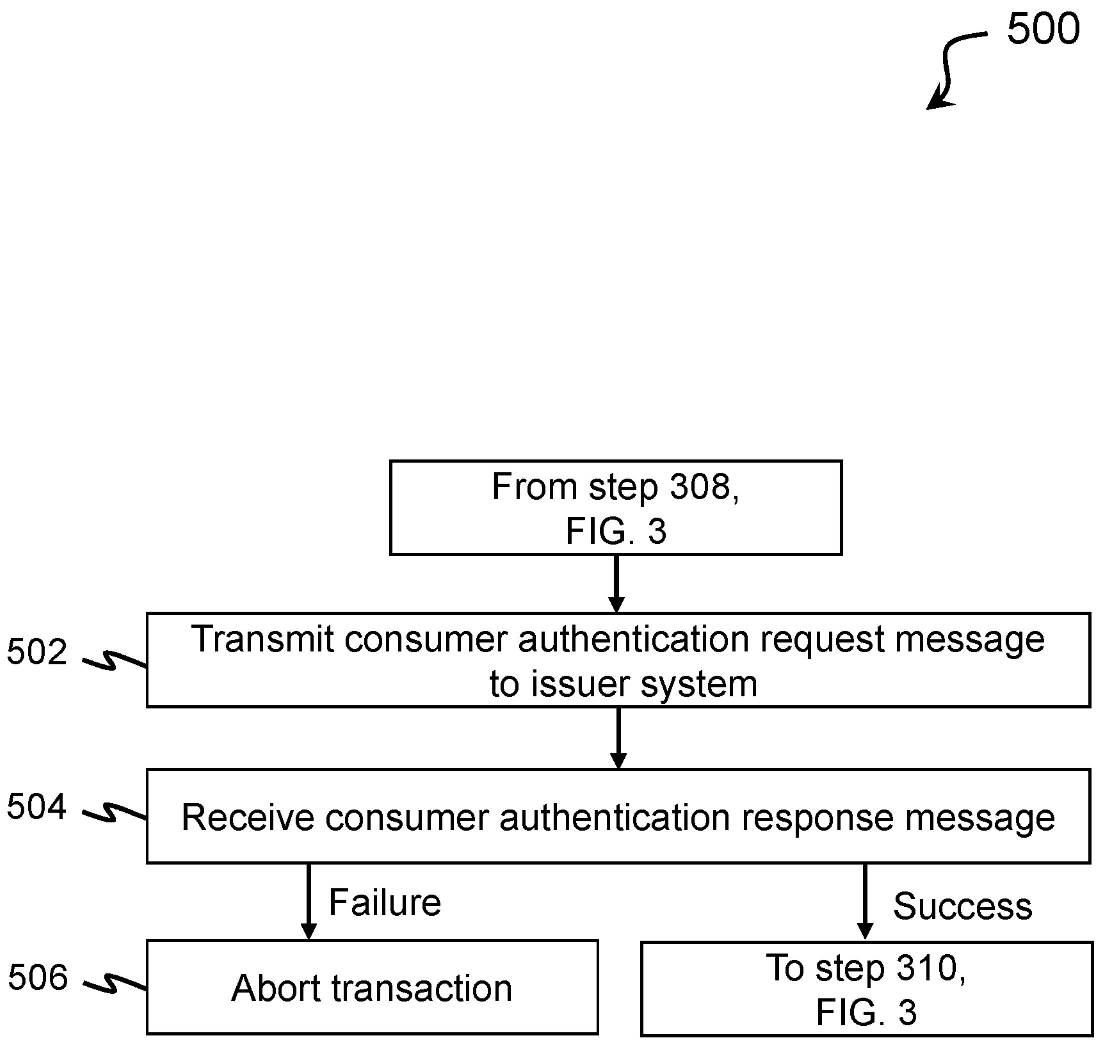
FIG. 5 is a flow diagram of non-limiting embodiments or aspects of a method for secure client device and consumer authentication.

Referring now to FIG. 5, illustrated is a flow diagram of a method 500 for secure client device and consumer authentication. Method 500 illustrates non-limiting embodiments or aspects of a step-up consumer authentication process flow. One or more steps of method 500 may be executed by one or more processors of a payment gateway 108, a transaction processing system 112, and/or other computing device. Each step of method 500 may be performed by a same or different processor as any other step of method 500. One or more computing devices for performing method 500 may be associated with a same or separate computing device or system. The order of the steps depicted in FIG. 5 are for illustrative purposes only and may be rearranged or combined, unless otherwise explicitly provided for as described herein.

As described in connection with step 308 of method 300 (depicted in FIG. 3), if the authentication of the client device was successful and further step-up authentication is required, the method 300 may proceed to method 500. In particular, the method 300 may proceed to step 502. In step 502, a consumer authentication request message may be transmitted to the issuer system 114. For example, payment gateway 108 may transmit a consumer authentication request message to an issuer system 114 associated with an issuer of the account of the consumer. The consumer authentication request message may include data of the client device authentication process. The issuer system 114 may be configured on the electronic payment processing network as separate from the payment gateway 108 and the transaction processing system 112.

In step 504, a consumer authentication response message may be received. For example, payment gateway 108 may receive a consumer authentication response message from the issuer system 114 indicating successful or failed authentication of the consumer. The transaction may be processed further in response to the consumer authentication response message. If the consumer authentication response message indicates failed authentication of the consumer, the transaction may be aborted in step 506, or the method 500 may return to step 502 to reattempt the consumer authentication. If the consumer authentication response message indicates successful authentication of the consumer, the method 500 may proceed to step 310 of method 300 (depicted in FIG. 3) to complete processing of the transaction.

Figure 6:
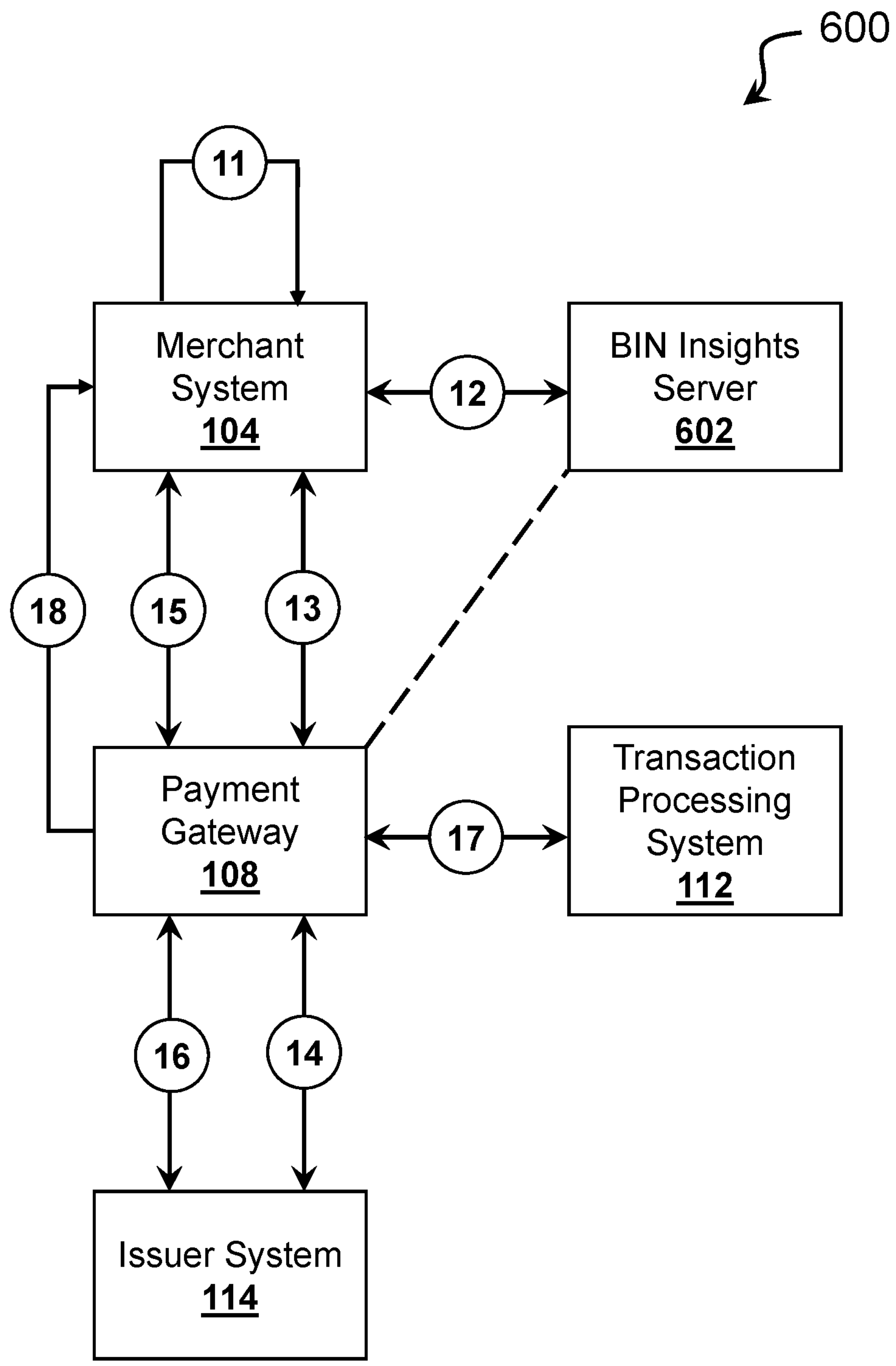
FIG. 6 is a network and process diagram of non-limiting embodiments or aspects of a system and method for secure client device and consumer authentication.

With specific reference to FIG. 6, provided is a system 600 for secure client device and consumer authentication, according to some non-limiting embodiments or aspects. System 600 illustrates an exemplary process flow for registration (e.g., FIDO registration) of a client device 102 (e.g., a public key of a public-private key pair of the client device 102). The steps shown in system 600 may be carried out through communications between merchant system 104, payment gateway 108, issuer system 114, transaction processing system 112, and bank identification number (BIN) intelligence server 602, as depicted by the directional arrow lines connecting the entity blocks. The payment gateway 108 may include the BIN intelligence server (BIS) 602, which is represented by the dashed line connecting the two entities. The process depicted in connection with system 600 may be executed in response to a transaction initiated by a consumer using a client device 102. The client device 102 may transmit payment credentials, including a PAN, to the merchant system 104 for the transaction. The order of the steps depicted in FIG. 6 are for illustrative purposes only and may be rearranged or combined, unless otherwise explicitly provided for as described herein.

In step 11, merchant system 104 may determine whether a client device 102 is compatible with a client device authentication process, such as a FIDO authentication process. For example, the merchant system 104 may determine that a client device 102 is compatible if the client device 102 is capable of one or more of the following steps: generating a public-private key pair, storing a private key of the public-private key pair, communicating with one or more systems in the electronic payment processing network, storing payment credentials associated with a payment account, engaging in transactions with merchants, completing a step-up consumer authentication process in a user interface, and/or the like. Client device 102 compatibility may be communicated in the data of a request to complete a transaction that is transmitted to the merchant system 104. The merchant system 104 may evaluate the received data to determine whether the client device 102 is compatible.

In step 12, the merchant system 104 may communicate with the BIS 602 (e.g., directly or through a payment gateway 108) to gather information about the client device 102 or the account of the consumer. For example, the merchant system 104 may use the PAN received from the client device 102 to determine additional information about the client device 102 or the account of the consumer. The additional information may include data indicating whether the client device 102 was previously registered for use in the client device authentication process.

In step 13, the merchant system 104 may communicate with a payment gateway 108 to determine an issuer system 114 associated with the PAN for initiation of a consumer authentication process (e.g., 3-D Secure authentication).

In step 14, the payment gateway 108 may execute a consumer authentication process by transmitting an authorization request message to the issuer system 114 that includes information about the transaction. Also in step 14, as part of the consumer authentication process, the issuer system 114 may transmit to the payment gateway 108 an authorization response message, which may contain data that indicates whether step-up authentication is required.

If step-up authentication is required, the payment gateway 108 may communicate with a merchant system 104 to initiate a step-up authentication process (e.g., triggering a 3-D Secure interface and process on the client device 102), in step 15.

In step 16, as part of the step-up authentication process, the payment gateway 108 may communicate with the issuer system 114 to send and receive a challenge request message and a challenge response message, respectively. The challenge request message and challenge response message may complete the step-up authentication process, by evaluating and approving the credentials of the consumer input to the client device 102 and received at the issuer system 114. If the credentials are approved, the step-up authentication will succeed. If the credentials are not approved, the step-up authentication will fail.

In step 17, the payment gateway 108 may communicate with a transaction processing system 112 (e.g., an authentication server of the transaction processing system 112) to register the PAN with a public key of a public-private key pair of the client device 102.

In step 18, the payment gateway 108 may communicate with the merchant system 104 to assert the authentication of the client device 102 and/or the consumer.

Figure 7:
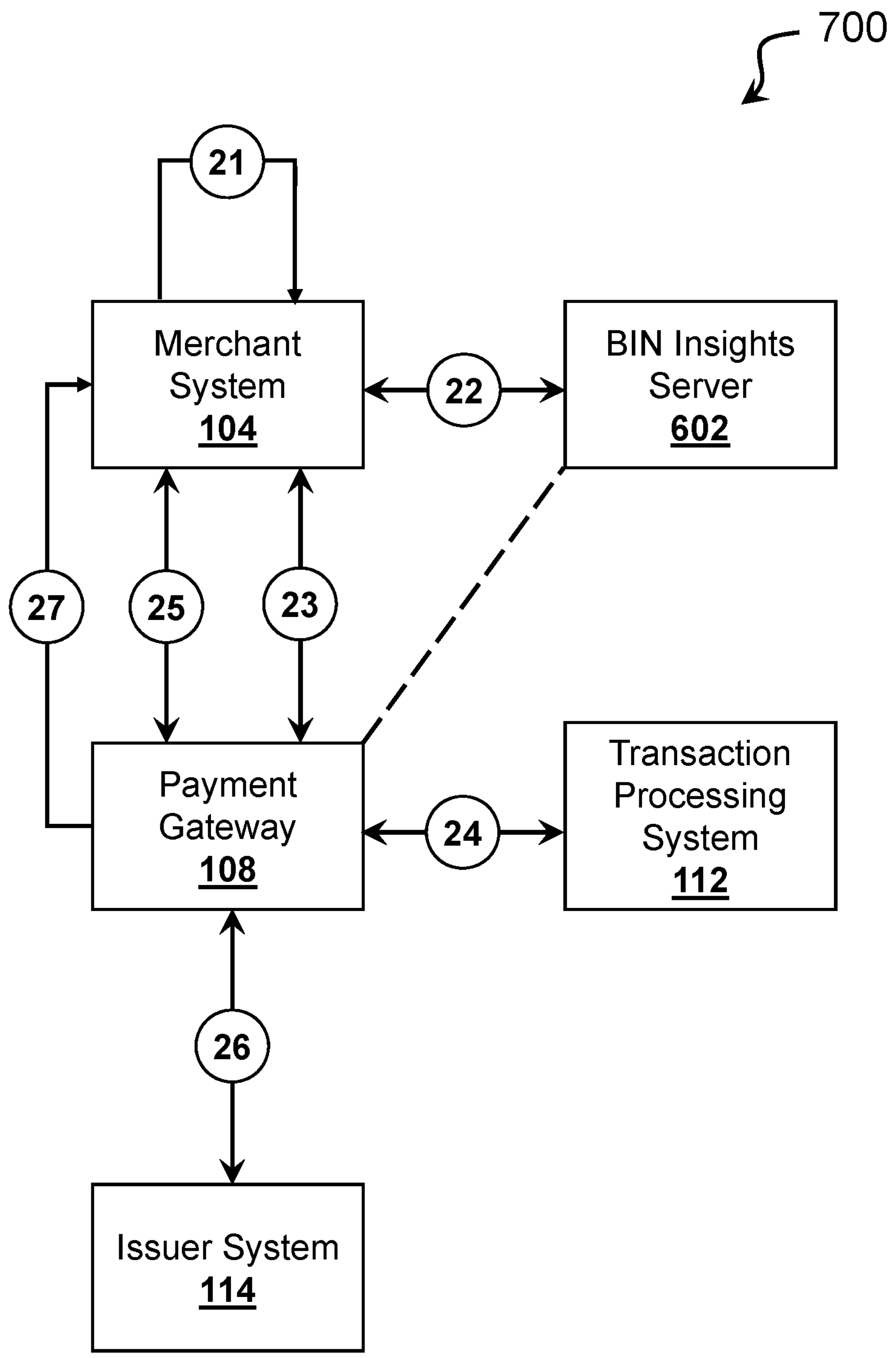
FIG. 7 is a network and process diagram of non-limiting embodiments or aspects of a system and method for secure client device and consumer authentication.

With specific reference to FIG. 7, provided is a system 700 for secure client device and consumer authentication, according to some non-limiting embodiments or aspects. System 700 illustrates an exemplary process flow for authentication (e.g., FIDO login) of a client device 102 (e.g., a public key of a public-private key pair of the client device 102), which has been previously registered, such as in system 600 of FIG. 6. The steps shown in system 700 may be carried out through communications between merchant system 104, payment gateway 108, issuer system 114, transaction processing system 112, and BIS 602, as depicted by the directional arrow lines connecting the entity blocks. The payment gateway 108 may include the BIS 602, which is represented by the dashed line connecting the two entities. The process depicted in connection with system 700 may be executed in response to a transaction initiated by a consumer using a client device 102. The client device 102 may transmit payment credentials, including a PAN, to the merchant system 104 for the transaction. The order of the steps depicted in FIG. 7 are for illustrative purposes only and may be rearranged or combined, unless otherwise explicitly provided for as described herein.

In step 21, the merchant system 104 may determine if the client device 102 is compatible with the client device authentication process (e.g., FIDO authentication). For example, the merchant system 104 may determine that a client device 102 is compatible if the client device 102 is capable of one or more of the following steps: generating a public-private key pair, storing a private key of the public-private key pair, communicating with one or more systems in the electronic payment processing network, storing payment credentials associated with a payment account, engaging in transactions with merchants, completing a step-up consumer authentication process in a user interface, and/or the like. Client device 102 compatibility may be communicated in the data of a request to complete a transaction that is transmitted to the merchant system 104. The merchant system 104 may evaluate the received data to determine whether the client device 102 is compatible.

In step 22, the merchant system 104 may communicate with a BIS 602 to gather information about the client device 102.

In step 23, the merchant system 104 may communicate with a payment gateway 108 to initiate login for a client device authentication process. In step 24, the payment gateway 108 may subsequently communicate with an authentication server (e.g., of a transaction processing system 112) to initiate login for the client device authentication process.

In step 25, the merchant system 104 may communicate with the payment gateway 108 to determine an issuer system 114 associated with the PAN for initiation of a consumer authentication process (e.g., 3-D Secure authentication).

In step 26, the payment gateway 108 may communicate with the issuer system 114 to send and receive an authorization request message and an authorization response message of a consumer authentication process, respectively.

In step 27, the payment gateway 108 may communicate with the merchant system 104 to assert the authentication of the client device 102 and/or the consumer.

Figure 8:
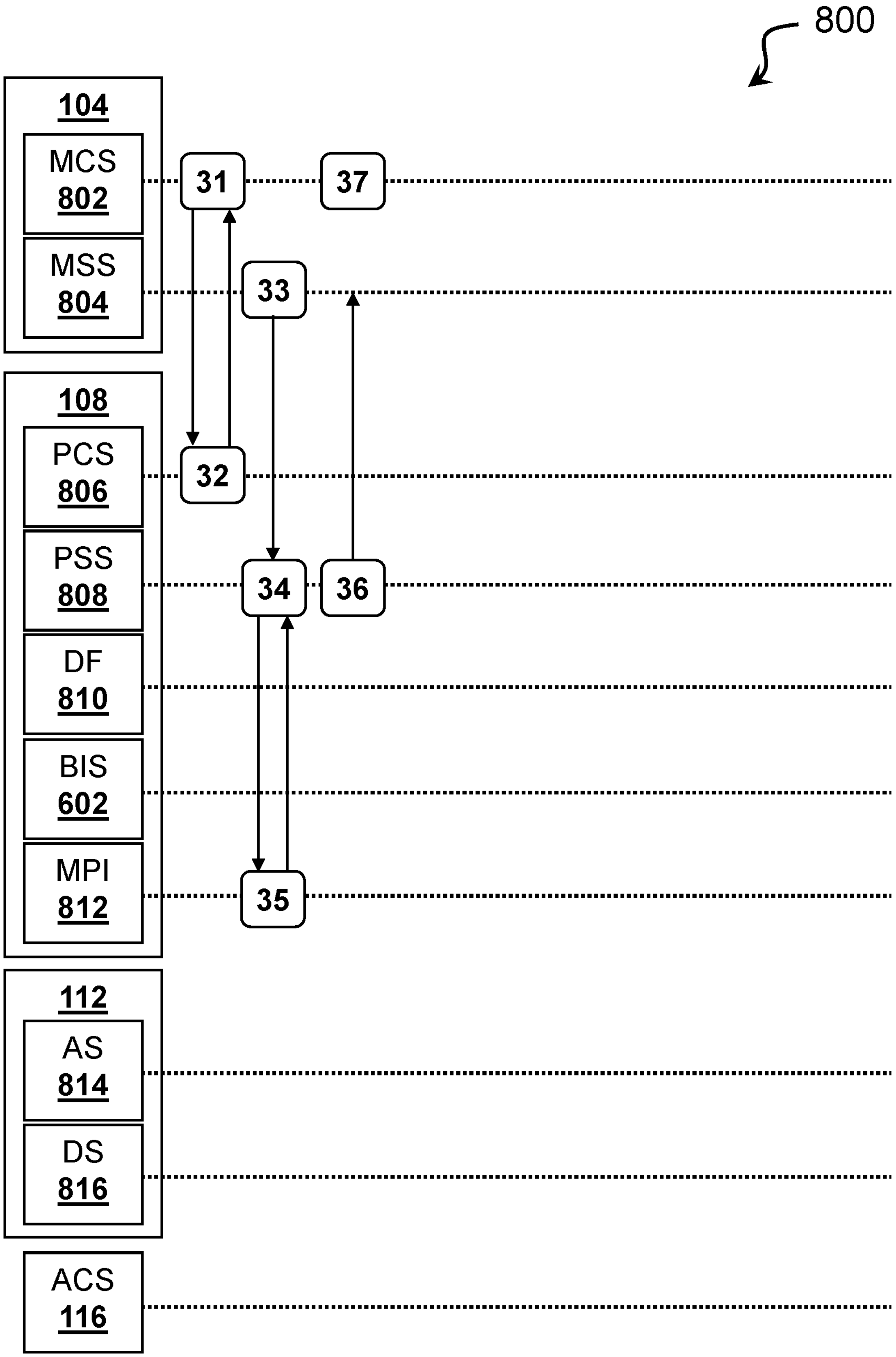
FIG. 8 is a network and process diagram of non-limiting embodiments or aspects of a system and method for secure client device and consumer authentication.

With specific reference to FIG. 8, provided is a system 800 for secure client device and consumer authentication, according to some non-limiting embodiments or aspects. System 800 illustrates an exemplary process flow for checking compatibility of the client device 102 with a client device authentication process (e.g., FIDO authentication). The steps shown in system 800 may be carried out through communications between: (i) a merchant system 104, which may include a merchant client-side system (MCS) 802 and a merchant server-side system (MSS) 804; (ii) a payment gateway 108 system, which may include a payment gateway client-side system (PCS) 806, a payment gateway server-side system (PSS) 808, a device fingerprint system (DF) 810, the BIS 602, and a merchant plug-in interface system (MPI) 812; (iii) a transaction processing system 112, which may include an authentication system (AS) 814 and a directory system (DS) 816; and (iv) an issuer system 114, which may include an ACS 116. Exemplary communications are depicted by the directional arrow lines connecting the entity blocks, processing steps are represented by the numbered blocks corresponding to levels of the system components, and arrows passing through step blocks may be interpreted as messages communicated through the entities at each block. The order of the steps depicted in FIG. 8 are for illustrative purposes only and may be rearranged or combined, unless otherwise explicitly provided for as described herein.

In some non-limiting embodiments or aspects, the MCS 802 and MSS 804 may include one or more servers of the merchant system 104 operating a merchant eCommerce website or merchant application. The MCS 802 may communicate with the client device 102 via an interface (e.g., API) to display and populate an interface for completing a transaction with the merchant system 104. The MCS 802 may be configured to communicate with the client device 102, PCS 806, and PSS 808, and the MSS 804 may be configured to communicate with the MPI 812. The PCS 806, PSS 808, and MPI 812 may include one or more servers of the payment gateway 108 that are configured for external-facing communications with the merchant system 104, to provide merchant integration for the client device authentication process. The PCS 806 may communicate with the client device 102 to provide an authentication window for receiving user input and credentials. DF 810 may include one or more servers of the payment gateway 108 that are configured for internal-facing communications within the payment gateway 108, to collect client device 102 data, relay information to the issuer system 114, and complete transaction risk assessments. AS 814 may include one or more servers of a transaction processing system 112 that are configured for third party communication with multiple payment gateways 108, to provide the client device authentication process. DS 816 may include one or more servers of a transaction processing system 112 that are maintained by the transaction service provider network, and which may store payment device registration data, payment device capabilities, and handle routing to the issuer system 114. The ACS 116 may include one or more servers of an issuer system 114, or of a third party on behalf of the issuer system 114, which are configured to receive authentication messages, process authentication messages, and return authentication results.

In step 31, the MCS 802 may receive a request from a client device 102 for completion of a transaction. In response, in step 31, the MCS 802 may transmit a message to the PCS 806 to initiate a check for compatibility of the client device 102 with a client device authentication process. The message to the PCS 806 in step 31 may include data associated with the client device 102, which may be initially received by the MCS 802 from the client device 102 via the interface with the client device 102.

In step 32, the PCS 806 may receive the message from the MCS 802 with the data associated with the client device 102 and may determine compatibility of the client device 102 with the client device authentication process. The response message may include a field (e.g., a Boolean, a flag, etc.) indicating the compatibility status. If the client device 102 is compatible, the PCS 806 may transmit a response message to the MCS 802 indicating that the client device 102 is compatible, in which case the transaction may proceed to be authenticated by means of the client device authentication process. If the client device 102 is not compatible, the PCS 806 may transmit a response message to the MCS 802 indicating that the client device 102 is not compatible, in which case the transaction may be aborted or authenticated through an alternative process to the client device authentication process.

In step 33, the MSS 804 may transmit a message to the payment gateway 108 to receive additional client device 102 and/or consumer information based on a PAN received via the MCS 802 from the client device 102, such as in the consumer's initiated request for completion of a transaction. For example, MSS 804 may transmit a message to the PSS 808 to request information from the BIS 602. The additional information requested may include the capabilities of the payment device being used by the consumer to complete the requested transaction. The payment gateway 108 may retrieve information about the ability of the payment device to be authenticated in the client device authentication process and communicate that information back to the merchant system 104, to allow the merchant system to determine how to proceed with the transaction.

In step 34, the PSS 808 may receive the request message for additional information from the MSS 804 and may transmit a request to the BIS 602 to load the requested information from the BIS 602.

In step 35, the BIS 602 may receive the request message from the PSS 808 and generate a reference identifier (ID) for the request and/or a merchant-consumer session to be generated and linked to the back-and-forth communications of the client device authentication process. In response to receiving the request message from the PSS 808, the BIS 602 may retrieve, from a data store, the requested information about the client device 102 and/or consumer and transmit the information, including the generated reference ID, in a response message to the PSS 808. The PSS 808 may then receive the information in the response message from the BIS 602, generate a hash of the PAN, create a new merchant-consumer session data object, add the PAN hash to the merchant-consumer session data object, and check to see if the client device 102 has gone through the registration process flow for the client device authentication process. If the client device 102 has been registered, the login process shown in FIG. 10 may be executed. If the client device 102 has not been registered, the registration process shown in FIG. 9 may be executed.

In step 36, a response message including a payload of the requested information may be transmitted from the PSS 808 to the MSS 804. The MSS 804 may receive the payload and determine how to proceed with the client device authentication process, as described above.

In step 37, MCS 802 may communicate via an interface with the client device 102 of the consumer to receive final transaction information before proceeding. For example, if the client device 102 is compatible with the client device authentication process but has not yet been registered, the MCS 802 may communicate data to the client device 102 configured to display an opt-in option (e.g., a "Save Card" checkbox), including a privacy statement regarding the client device authentication process. If the consumer using the client device 102 selects the opt-in option, then the registration process flow of the client device authentication process may be executed. Alternatively or additionally, the MCS 802 may communicate data to the client device 102 configured to display a proceed option (e.g., a "Checkout" button), which may allow the consumer to choose to proceed with the transaction and the client device authentication process.

Figure 9:
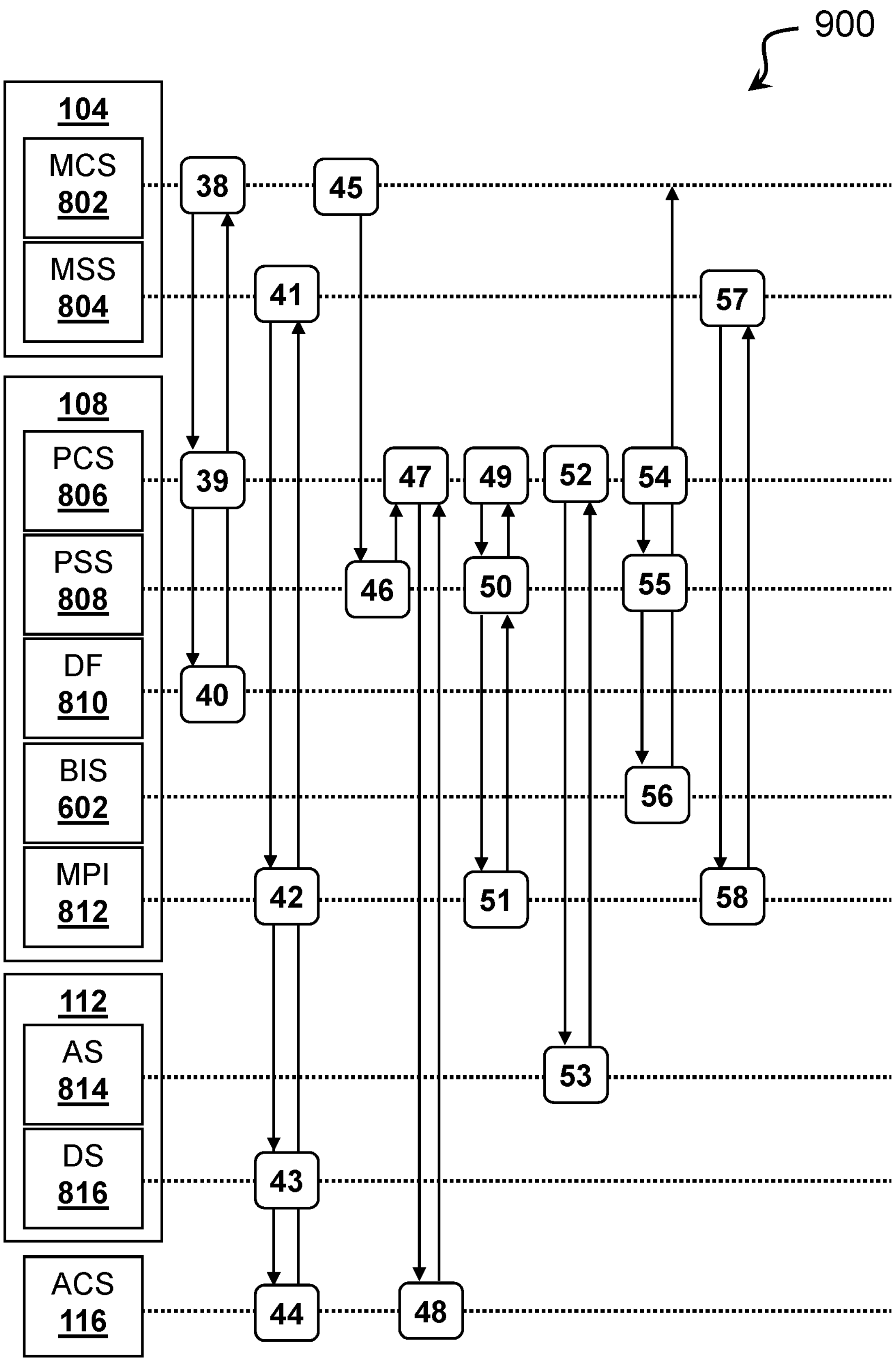
FIG. 9 is a network and process diagram of non-limiting embodiments or aspects of a system and method for secure client device and consumer authentication.

With specific reference to FIG. 9, provided is a system 900 for secure client device and consumer authentication, according to some non-limiting embodiments or aspects. System 900 illustrates an exemplary registration process flow for a client device authentication process (e.g., FIDO registration). The steps shown in system 900 may be carried out through communications between: (i) a merchant system 104, which may include the MCS 802 and the MSS 804; (ii) a payment gateway 108 system, which may include the PCS 806, the PSS 808, the DF 810, the BIS 602, and the MPI 812; (iii) a transaction processing system 112, which may include the AS 814 and the DS 816; and (iv) an issuer system 114, which may include the ACS 116. Exemplary communications are depicted by the directional arrow lines connecting the entity blocks, processing steps are represented by the numbered blocks corresponding to levels of the system components, and arrows passing through step blocks may be interpreted as messages communicated through the entities at each block. The order of the steps depicted in FIG. 9 are for illustrative purposes only and may be rearranged or combined, unless otherwise explicitly provided for as described herein.

Steps 38-40 illustrate a profiling process for the registration process flow of the client device authentication process. In step 38, the MCS 802 may transmit a message to the PCS 806 to request collection/storage of a device fingerprint for the client device 102. The message to the PCS 806 may include the reference ID generated by the BIS 602. In step 39, the PCS 806 may forward the request to the DF 810, which may receive the request and complete the profiling process, such as by collecting information about the software and/or hardware of the client device 102 for the purpose of identification, such as to the issuer system 114. The device fingerprint may fully or partially identify the client device 102, to detect and prevent identity theft and payment device fraud. In step 40, response messages from the profiling process may be communicated back from the DF 810 to the PCS 806 and the MCS 802.

Steps 41-44 illustrate a lookup process for the registration process flow of the client device authentication process. In step 41, the MSS 804 may transmit a lookup message to the MPI 812 including a field that indicates that the client device authentication process should be used for the transaction (e.g., a FIDO indicator). The lookup message may include transaction data (e.g., amount, description, billing address data (e.g., street address, city, country, zip code), consumer identification data (e.g., name, email address, phone number), merchant identification data (e.g., merchant ID, merchant processor ID), transaction type, payment device data (e.g., expiry, payment device ID, card type, fraud data, activity history data, token data), currency code, client device 102 interface data (e.g., browser data, internet protocol (IP) address), and/or the like). In step 42, the MPI 812 may transmit the lookup request to the DS 816. In step 43, the DS 816 may transmit the lookup request to the ACS 116. In step 44, the ACS 116 may transmit a lookup response message back to the MSS 804 via the DS 816 and MPI 812. The lookup response message may include a challenge request for completion of the client device authentication process. The lookup response message may further include data representative of an authentication process version, enrollment status in the authentication process, transaction data, and/or the like.

Steps 45-56 illustrate a step-up consumer authentication process for the registration process flow of the client device authentication process. In step 45, the MCS 802 may cause an authentication window (e.g., a 3-D Secure window) to be displayed in the application of the client device 102 by communicating with the PCS 806. The MCS 802 may transmit a message to the PCS 806 to execute the step-up consumer authentication process and render the authentication window to allow the consumer to interface with the consumer authentication process. In step 46, the PCS 806 may cause the authentication window to be rendered on the client device 102. The consumer may then input credentials (e.g., username, password, key, etc.) for the step-up consumer authentication process. In step 47, the PCS 806 may generate a challenge request message to the ACS 116 for consumer authentication processing. The challenge request message may include at least a portion of the input credentials. In step 48, the ACS 116 may generate a challenge response message and transmit the challenge response message to the PCS 806. If the consumer authentication process fails, the challenge response message may include a field indicating that the consumer authentication process failed, and the transaction may be aborted or the consumer may be prompted on the client device 102 to try again. If the consumer authentication process succeeds, the challenge response message may include a field indicating that the consumer authentication process succeeded, and the client device registration process may proceed.

In step 49, after receiving a challenge response message indicating successful consumer authentication, the PCS 806 may transmit a message to the PSS 808 to update the merchant system on the status of the authentication process and prepare to redirect the application of the client device 102 to a merchant webpage for completion of the transaction. In response, in step 50, the PSS 808 may transmit a consumer authentication update message to the MPI 812. The consumer authentication message may be configured to return the consumer authentication outcome to the merchant system 104, enabling the merchant system 104 to handle the transaction processing according to the outcome. In step 51, the MPI 812 may generate a hash of the PAN and generate a consumer authentication update response message to the PSS 808. The consumer authentication update response message may include the PAN hash as well as an indicator to proceed with the client device authentication process.

In step 52, feedback is provided to the consumer to indicate how the client device authentication is proceeding. For example, the PCS 806 may re-render the authentication window displayed on the client device 102 to identify that the PAN will be registered with the client device authentication process. Using the PAN as opposed to a username or email provides the advantage of being able to execute the client device authentication process across multiple merchants, e.g., wherever the client device 102 is used. Also in step 52, the PCS 806 may generate a registration message to the AS 814, to cause the AS 814 to register the PAN as a key identifier (e.g., like a username) for the client device authentication process. The registration message may include the PAN hash. In step 53, the AS 814 may return attestation data in response to receipt of the registration message.

In step 54, PCS 806 may receive a public key of a public-private key pair of the client device 102 for recordation at the payment gateway 108 with the registration data. By shifting the process to the payment gateway 108, the computational burden of handling registration is taken off of individual merchant systems 104. In step 54, the public key may be transmitted from the PCS 806 to the PSS 808, which may verify the public key. In step 55, the PSS 808 may record the registration of the PAN for client device authentication by transmitting a recordation message to the BIS 602. In step 56, the registration data received from the AS 814 in step 53, including at least the PAN hash, may be persisted in memory in a data store in association with the public key of the client device 102. Also in step 56, a status message indicating success of the recordation may be transmitted back from the BIS 602 to the PCS 806 via the PSS 808. The status message indicating success of the recordation may also cause the application of the client device 102 to update and navigate to a merchant web page using a return uniform resource locator (URL).

Steps 57 and 58 illustrate a results retrieval process for the registration process flow of the client device authentication process. In step 57, MSS 804 may generate and transmit a request message to the MPI 812 to retrieve the results from the consumer authentication process. In step 58, the MPI 812 may generate and transmit a response message to the MSS 804 including the results (e.g., success, failure) of the consumer authentication process. The response message may also include an additional field indicating the results (e.g., success, failure) of the client device registration process.

Figure 10:
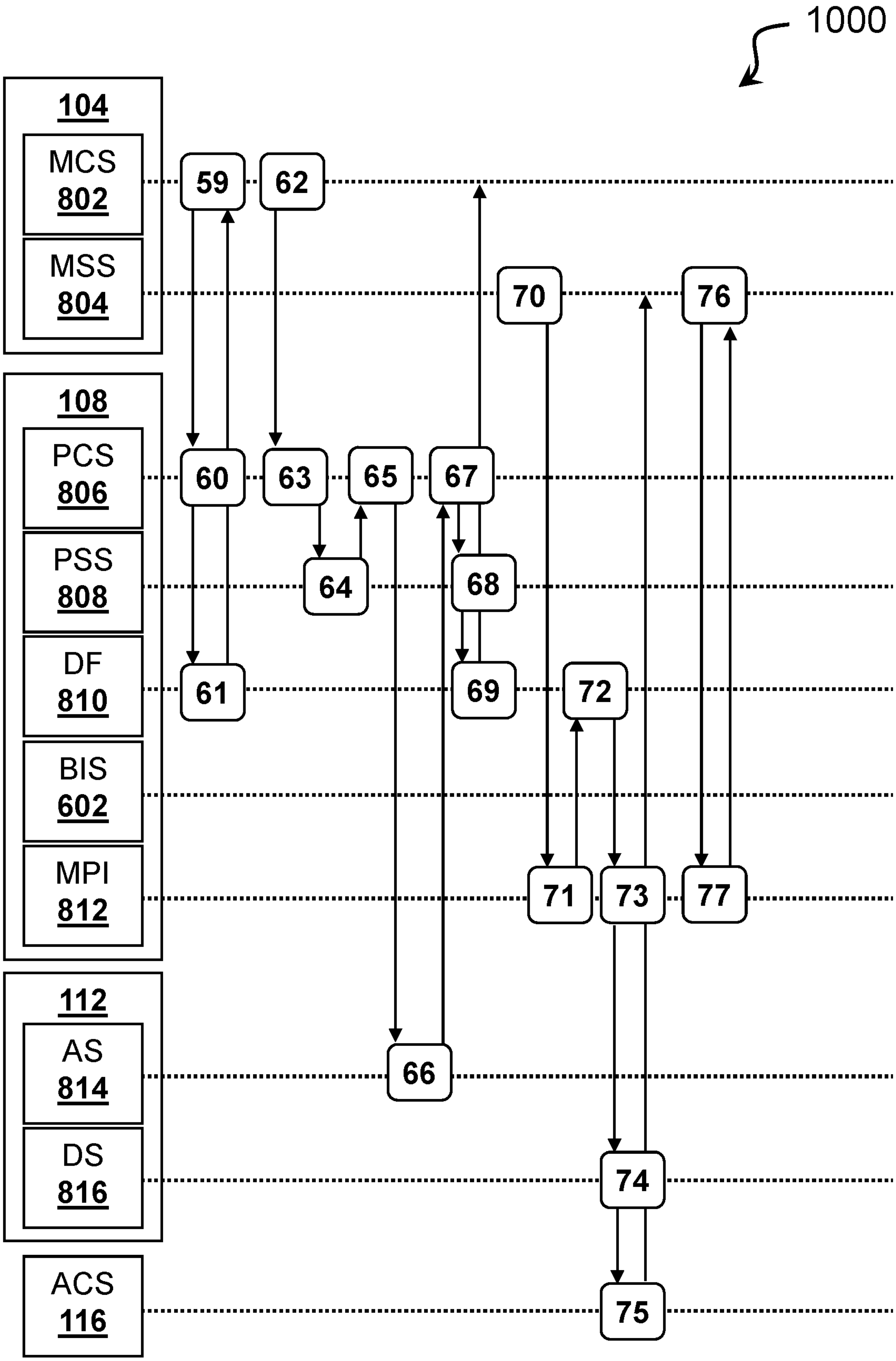
FIG. 10 is a network and process diagram of non-limiting embodiments or aspects of a system and method for secure client device and consumer authentication.

With specific reference to FIG. 10, provided is a system 1000 for secure client device and consumer authentication, according to some non-limiting embodiments or aspects. System 1000 illustrates an exemplary login process flow for a client device authentication process (e.g., FIDO login). The steps shown in system 1000 may be carried out through communications between: (i) a merchant system 104, which may include the MCS 802 and the MSS 804; (ii) a payment gateway 108 system, which may include the PCS 806, the PSS 808, the DF 810, the BIS 602, and the MPI 812; (iii) a transaction processing system 112, which may include the AS 814 and the DS 816; and (iv) an issuer system 114, which may include the ACS 116. Exemplary communications are depicted by the directional arrow lines connecting the entity blocks, processing steps are represented by the numbered blocks corresponding to levels of the system components, and arrows passing through step blocks may be interpreted as messages communicated through the entities at each block. The order of the steps depicted in FIG. 10 are for illustrative purposes only and may be rearranged or combined, unless otherwise explicitly provided for as described herein.

Steps 59-61 illustrate a profiling process for the login process flow of the client device authentication process. In step 59, the MCS 802 may transmit a message to the PCS 806 to request collection/storage of a device fingerprint for the client device 102. The message to the PCS 806 may include the reference ID generated by the BIS 602. In step 60, the PCS 806 may forward the request to the DF 810, which may receive the request and complete the profiling process, such as by collecting information about the software and/or hardware of the client device 102 for the purpose of identification, such as to the issuer system 114. The device fingerprint of the client device 102 may fully or partially identify the client device 102, to detect and prevent identity theft and payment device fraud. In step 61, response messages from the profiling process may be communicated back from the DF 810 to the PCS 806 and the MCS 802.

Steps 62-69 illustrate a client device login process flow of a client device authentication process. In step 62, the MCS 802 may transmit a login request message to the PCS 806. The login request message may include the reference ID. Based on the reference ID of the login message, in step 63, the PCS 806 may communicate with the PSS 808 to retrieve data of the merchant-consumer session associated with the reference ID. In step 64, the PSS 808 may retrieve the PAN hash and check the registration status of the client device 102 associated with the login request transmitted from the MCS 802. Also in step 64, the PSS 808 may transmit the PAN hash and data of a registration status of the client device 102 to the PCS 806. Based on the data received from the PSS 808 in step 64, the PCS 806 may then, in step 65, initiate a login process by transmitting a login request message to the AS 814. The login request message sent by the PCS 806 may include a username that includes and/or is based on the PAN hash. The login request message may also include the reference ID. In step 66, the AS 814 may execute the login process using the received PAN hash. Also in step 66, the AS 814 may transmit a login response message to the PCS 806 based on success or failure of the login process based on the PAN hash. The login response message may include assertion data indicating whether the login process was successfully executed. The login response message may also include the public key of the public-private key pair used for the login process. In step 67, the PCS 806 may communicate the public key to the PSS 808 to cause the PSS 808 to verify the client device token in step 68. Also in step 68, the PSS 808 may communicate with the DF 810 to send the data associated with the interface of the client device 102 with data related to the login process. The results of the login process may further be forwarded from the DF 810 to the MCS 802 via the PSS 808 and the PCS 806.

Step 70-77 illustrate a lookup process of a merchant system 104 for the client device authentication process. In step 70, the MSS 804 may transmit a lookup request message to the MPI 812. In response to the lookup request message, in step 71, the MPI 812 may communicate with the DF 810 to retrieve data associated with the interface of the client device 102. In step 72, the DF 810 may transmit the data, which may include data received by the DF 810 in step 69 related to the login process executed in steps 62-69. After retrieving the data from the DF 810, the MPI 812 may transmit a lookup request message to the DS 816, in step 73. The DS 816 may forward the lookup request message to the ACS 116 in step 74. The ACS 116 may process the lookup request and transmit a lookup response message to the MPI 812 via the DS 816 in step 75. The lookup response message may include account and/or payment device data associated with the client device 102, such as a cardholder authentication verification value (CAVV) and/or an electronic commerce indicator (ECI), which may include data indicative of the success or failure of the client device authentication process (e.g., results of a 3-D Secure authentication). Based on the data received from the ACS 116, the MSS 804 may, in step 76, transmit an authentication request message to the MPI 812 to authenticate the transaction, and in response, the MPI 812 may transmit an authentication response message to the MSS 804 in step 77.

With further reference to the foregoing figures, "electronic payment processing network" may refer to a plurality of computing devices that transmit and/or receive communications between one or more entities for processing the transfer of monetary funds to one or more transactions. The electronic payment processing network may include a merchant system, an acquirer system, a payment gateway, a transaction processing system, and an issuer system.

With further reference to the foregoing figures, a merchant interface on the client device 102 may be used to complete consumer authentication (e.g., 3-D Secure authentication) in parallel with (e.g., immediately before, during, or immediately after) client device authentication (e.g., FIDO authentication). The payment gateway 108 may communicate a consumer authentication request message (e.g., 3-D Secure 2.0 authentication request (AReq) message) to an issuer system 114 (e.g., an ACS 116, which may be included with or operated on behalf of the issuer system 114) associated with an issuer of the account of the consumer. The consumer authentication request message may include data of the client device authentication process (e.g., identifier indicating whether PAN has been registered, identifier indicating successful authentication, identifier indicating failed authentication, etc.). The payment gateway 108 may receive a consumer authentication response message (e.g., 3-D Secure 2.0 authentication response (ARes) message) from the issuer system 114 (e.g., an ACS 116) indicating successful authentication of the consumer. A client-side merchant interface (e.g., application, website etc.) on the client device 102 used for consumer authentication may include a communication channel also used for client device authentication, which may allow the consolidation of communication channels and the realization of computational resource and time savings.

Although the disclosure has been described in detail for the purpose of illustration based on what is currently considered to be the most practical and non-limiting embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:

prompting, with at least one processor of a payment gateway configured in an electronic payment processing network, a client device of a consumer to generate a public-private key pair comprising a private key and a public key;

receiving, with at least one processor of the payment gateway, the public key and a primary account number (PAN) of an account of the consumer from the client device;

transmitting, with at least one processor of the payment gateway, the public key and the PAN to a transaction processing system for registration of the public key in association with the PAN, wherein the transaction processing system is configured in the electronic payment processing network as separate from the payment gateway;

receiving, with at least one processor of the payment gateway, via a first merchant interface of a first merchant operated on the client device, a first transaction request for a first transaction between the account of the consumer and a first account of the first merchant, the first transaction request comprising the PAN;

determining, with at least one processor of the payment gateway, whether the PAN has been registered with the public key for use in a client device authentication process;

in response to determining that the PAN has been registered with the public key of the public-private key pair of the client device of the consumer, causing the transaction processing system to cryptographically authenticate the client device based on the public key by transmitting, with at least one processor of the payment gateway, a login request to the transaction processing system comprising a device identifier of the client device based on the PAN, wherein the login request is configured to cause an authentication server of the transaction processing system to execute a login process;

receiving, with at least one processor of the payment gateway, a login response from the transaction processing system associated with successful cryptographic authentication of the client device based on the public key of the public-private key pair of the client device, wherein the successful cryptographic authentication is based on a verification of the client device having possession of the private key corresponding to the public key registered with the PAN;

in response to receiving the login response associated with the successful cryptographic authentication of the client device, processing, with at least one processor of the payment gateway, the first transaction by generating a first transaction authorization request message comprising the PAN to the transaction processing system;

receiving, with at least one processor of the payment gateway, via a second merchant interface of a second merchant operated on the client device, a second transaction request for a second transaction between the account of the consumer and a second account of the second merchant, the second transaction request comprising the PAN;

determining, with at least one processor of the payment gateway, that the PAN has been registered with the public key;

transmitting, with at least one processor of the payment gateway, a new login request to the transaction processing system comprising the device identifier of the client device based on the PAN; and in response to receiving a new login response associated with successful cryptographic authentication of the client device, processing, with at least one processor of the payment gateway, the second transaction by generating a second transaction authorization request message comprising the PAN to the transaction processing system.

2. The computer-implemented method of claim 1, further comprising:

transmitting, with at least one processor of the payment gateway, a consumer authentication request message to an issuer system associated with an issuer of the account of the consumer, wherein the consumer authentication request message comprises data of the client device authentication process, and wherein the issuer system is configured in the electronic payment processing network as separate from the payment gateway and the transaction processing system; and receiving, with at least one processor of the payment gateway, a consumer authentication response message from the issuer system indicating successful authentication of the consumer, wherein the first transaction is processed further in response to receipt of the consumer authentication response message.

3. The computer-implemented method of claim 1, wherein the login response comprises data indicating that the public key of the public-private key pair of the client device was successfully matched with the private key of the public-private key pair stored on the client device, through execution of the client device authentication process.

4. The computer-implemented method of claim 1, further comprising receiving, with at least one processor of the payment gateway, an initial request from a first merchant system of the first merchant for the payment gateway to process the first transaction, wherein the initial request comprises the PAN.

5. The computer-implemented method of claim 4, wherein the first transaction is an online, card-not-present transaction between the consumer and the first merchant associated with the first merchant system.

6. A system, comprising:

at least one processor of a payment gateway configured in an electronic payment processing network; and at least one non-transitory computer-readable medium including one or more instructions that, when executed by the at least one processor, cause the at least one processor to:

prompt a client device of a consumer to generate a public-private key pair comprising a private key and a public key;

receive the public key and a primary account number (PAN) of an account of the consumer from the client device;

transmit the public key and the PAN to a transaction processing system for registration of the public key in association with the PAN, wherein the transaction processing system is configured in the electronic payment processing network as separate from the payment gateway;

receive, via a first merchant interface of a first merchant operated on the client device, a first transaction request for a first transaction between the account of the consumer and a first account of the first merchant, the first transaction request comprising the PAN;

determine whether the PAN has been registered with the public key for use in a client device authentication process;

in response to determining that the PAN has been registered with the public key of the public-private key pair of the client device of the consumer, cause the transaction processing system to cryptographically authenticate the client device based on the public key by transmitting a login request to the transaction processing system comprising a device identifier of the client device based on the PAN, wherein the login request is configured to cause an authentication server of the transaction processing system to execute a login process;

receive a login response from the transaction processing system associated with successful cryptographic authentication of the client device based on the public key of the public-private key pair of the client device, wherein the successful cryptographic authentication is based on a verification of the client device having possession of the private key corresponding to the public key registered with the PAN;

in response to receiving the login response associated with the successful cryptographic authentication of the client device, process the first transaction by generating a first transaction authorization request message comprising the PAN to the transaction processing system;

receive, via a second merchant interface of a second merchant operated on the client device, a second transaction request for a second transaction between the account of the consumer and a second account of the second merchant, the second transaction request comprising the PAN;

determine that the PAN has been registered with the public key;

transmit a new login request to the transaction processing system comprising the device identifier of the client device based on the PAN; and in response to receiving a new login response associated with successful cryptographic authentication of the client device, process the second transaction by generating a second transaction authorization request message comprising the PAN to the transaction processing system.

7. The system of claim 6, wherein the one or more instructions further cause the at least one processor to:

transmit a consumer authentication request message to an issuer system associated with an issuer of the account of the consumer, wherein the consumer authentication request message comprises data of the client device authentication process, and wherein the issuer system is configured in the electronic payment processing network as separate from the payment gateway and the transaction processing system; and receive a consumer authentication response message from the issuer system indicating successful authentication of the consumer, wherein the first transaction is processed further in response to receipt of the consumer authentication response message.

8. The system of claim 6, wherein the login response comprises data indicating that the public key of the public-private key pair of the client device was successfully matched with the private key of the public-private key pair stored on the client device, through execution of the client device authentication process.

9. The system of claim 6, wherein the one or more instructions further cause the at least one processor to receive an initial request from a first merchant system of the first merchant for the payment gateway to process the first transaction, wherein the initial request comprises the PAN.

10. The system of claim 9, wherein the first transaction is an online, card-not-present transaction between the consumer and the first merchant associated with the merchant system.

11. A computer program product comprising at least one non-transitory computer-readable medium including one or more instructions that, when executed by at least one processor of a payment gateway configured in an electronic payment processing network, cause the at least one processor to:

prompt a client device of a consumer to generate a public-private key pair comprising a private key and a public key;

receive the public key and a primary account number (PAN) of an account of the consumer from the client device;

transmit the public key and the PAN to a transaction processing system for registration of the public key in association with the PAN, wherein the transaction processing system is configured in the electronic payment processing network as separate from the payment gateway;

receive, via a first merchant interface of a first merchant operated on the client device, a first transaction request for a first transaction between the account of the consumer and a first account of the first merchant, the first transaction request comprising the PAN;

determine whether the PAN has been registered with the public key for use in a client device authentication process;

in response to determining that the PAN has been registered with the public key of the public-private key pair of the client device of the consumer, cause the transaction processing system to cryptographically authenticate the client device based on the public key by transmitting a login request to the transaction processing system comprising a device identifier of the client device based on the PAN, wherein the login request is configured to cause an authentication server of the transaction processing system to execute a login process;

receive a login response from the transaction processing system associated with successful cryptographic authentication of the client device based on the public key of the public-private key pair of the client device, wherein the successful cryptographic authentication is based on a verification of the client device having possession of the private key corresponding to the public key registered with the PAN;

in response to receiving the login response associated with the successful cryptographic authentication of the client device, process the first transaction by generating a first transaction authorization request message comprising the PAN to the transaction processing system;

receive, via a second merchant interface of a second merchant operated on the client device, a second transaction request for a second transaction between the account of the consumer and a second account of the second merchant, the second transaction request comprising the PAN;

determine that the PAN has been registered with the public key;

transmit a new login request to the transaction processing system comprising the device identifier of the client device based on the PAN; and in response to receiving a new login response associated with successful cryptographic authentication of the client device, process the second transaction by generating a second transaction authorization request message comprising the PAN to the transaction processing system.

12. The computer program product of claim 11, wherein the one or more instructions further cause the at least one processor to:

transmit a consumer authentication request message to an issuer system associated with an issuer of the account of the consumer, wherein the consumer authentication request message comprises data of the client device authentication process, and wherein the issuer system is configured in the electronic payment processing network as separate from the payment gateway and the transaction processing system; and receive a consumer authentication response message from the issuer system indicating successful authentication of the consumer, wherein first the transaction is processed further in response to receipt of the consumer authentication response message.

13. The computer program product of claim 11, wherein the login response comprises data indicating that the public key of the public-private key pair of the client device was successfully matched with the private key of the public-private key pair stored on the client device, through execution of the client device authentication process.

14. The computer program product of claim 11, wherein the one or more instructions further cause the at least one processor to receive an initial request from a first merchant system of the first merchant for the payment gateway to process the first transaction, wherein the initial request comprises the PAN.

* * * * *